(12) United States Patent
Van Den Berg et al.

(10) Patent No.: US 8,444,061 B2
(45) Date of Patent: May 21, 2013

(54) SPRAY NOZZLE MANIFOLD

(75) Inventors: Robert Van Den Berg, Amsterdam (NL); Wouter Koen Harteveld, Amsterdam (NL); Hans Joachim Heinen, Gummerbach (DE); Thomas Paul Von Kossak-Glowczewski, Gummersbach (DE)

(73) Assignee: Shell Oil Company, Houston, TX (US)

( * ) Notice: Subject to any disclaimer, the term of this patent is extended or adjusted under 35 U.S.C. 154(b) by 405 days.

(21) Appl. No.: 12/204,592

(22) Filed: Sep. 4, 2008

(65) Prior Publication Data

US 2009/0121039 A1    May 14, 2009

Related U.S. Application Data

(60) Provisional application No. 60/970,172, filed on Sep. 5, 2007.

(30) Foreign Application Priority Data

Sep. 4, 2007    (EP) ................................. 07115658

(51) Int. Cl.
     *B05B 1/28*      (2006.01)
     *B05B 7/12*      (2006.01)
     *F23D 11/10*      (2006.01)

(52) U.S. Cl.
     USPC ......... 239/105; 239/290; 239/416.5; 239/418

(58) Field of Classification Search
     USPC .............. 239/104–123, 418–434.5, 290, 294, 239/416.5
     See application file for complete search history.

(56) References Cited

U.S. PATENT DOCUMENTS

| | | | |
|---|---|---|---|
| 2,480,019 A * | 8/1949 | Grimmeisen | 239/106 |
| 2,797,963 A * | 7/1957 | Wilson | 239/105 |
| 2,970,772 A * | 2/1961 | Boosinger et al. | 239/105 |
| 2,998,464 A | 8/1961 | Burleson et al. | |
| 3,541,788 A * | 11/1970 | Schutz | 60/39.094 |
| 3,988,421 A | 10/1976 | Rinaldi | |
| 4,054,424 A * | 10/1977 | Staudinger et al. | 48/210 |
| 4,083,932 A * | 4/1978 | Muraco et al. | 423/210 |
| 4,848,982 A | 7/1989 | Tolle et al. | |
| 4,859,213 A | 8/1989 | Segerstrom | 48/87 |
| 4,890,793 A * | 1/1990 | Fuglistaller et al. | 239/427 |

(Continued)

FOREIGN PATENT DOCUMENTS

| | | |
|---|---|---|
| DE | 3809313 | 10/1989 |
| DE | 19714071 | 10/1998 |

(Continued)

*Primary Examiner* — Len Tran
*Assistant Examiner* — Justin Jonaitis

(57) ABSTRACT

A spray nozzle manifold comprising a first co-axial passage for supply of an atomization gas, a second co-axial passage present in said first passage for supply of a liquid, more than one laterally spaced nozzle for atomization and spraying liquid in a direction away from the longitudinal axis of the manifold attached to the first passage, said nozzles having an inlet for liquid fluidly connected to said second passage, an inlet for atomization gas fluidly connected to the first passage, a mixing chamber wherein atomization gas and liquid mix and an outlet for a mixture of atomization gas and liquid, wherein the nozzle has an opening for discharge of atomization gas which opening is in fluid communication with the first passage at a position upstream of the mixing chamber and wherein a shield is fixed to the first passage surrounding the nozzle.

11 Claims, 3 Drawing Sheets

| U.S. PATENT DOCUMENTS | | | | | FOREIGN PATENT DOCUMENTS | | |
|---|---|---|---|---|---|---|---|
| 4,897,090 | A | | 1/1990 | Liu et al. | DE | 10004138 | 8/2001 |
| 4,973,337 | A | * | 11/1990 | Jokisch et al. ............... 48/87 | DE | 102005004341 | 8/2006 |
| 5,124,134 | A | | 6/1992 | Come ...................... 422/194 | EP | 0318071 | 10/1988 |
| 5,329,760 | A | * | 7/1994 | Bradley et al. ............. 60/779 | EP | 0379022 | 7/1990 |
| 5,433,760 | A | | 7/1995 | Doering et al. | EP | 0400740 | 12/1990 |
| 5,648,048 | A | * | 7/1997 | Kuroda et al. ............ 422/168 | EP | 1178858 | 11/2000 |
| 5,732,885 | A | | 3/1998 | Huffman ................ 239/416.5 | JP | 62280578 | 12/1962 |
| 5,976,203 | A | | 11/1999 | Deeke et al. | JP | 53110967 | 9/1978 |
| 6,006,999 | A | * | 12/1999 | Tiessen et al. ................. 239/3 | WO | WO0037170 | 6/2000 |
| 6,062,547 | A | | 5/2000 | Nilsson | WO | WO2004005438 | 1/2004 |
| 6,149,137 | A | | 11/2000 | Johnson et al. | WO | WO2006117355 | 11/2006 |
| 2004/0222317 | A1 | | 11/2004 | Huffman ..................... 239/398 | | | |
| 2006/0260191 | A1 | | 11/2006 | Van Den Berg et al. | | | |

* cited by examiner

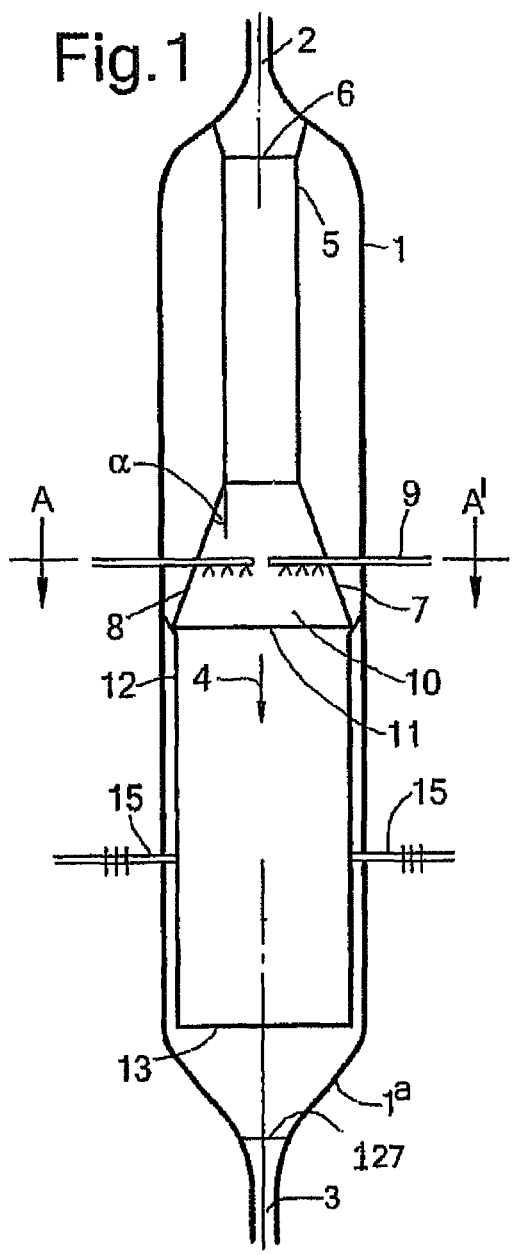
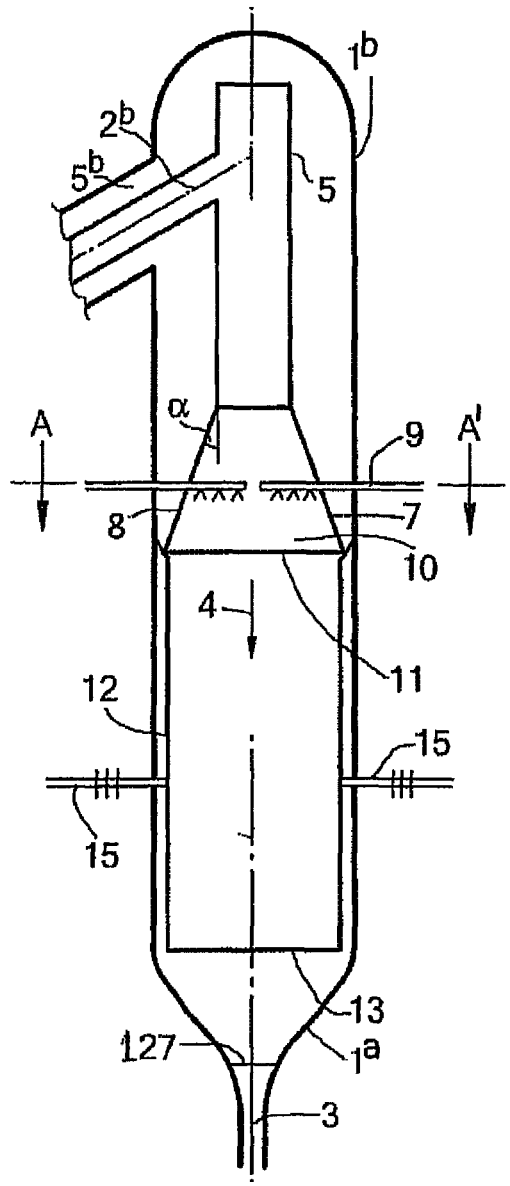

SPRAY NOZZLE MANIFOLD

This application claims the benefit of European Application no. 07115658.2 filed on 4 Sep. 2007 and U.S. Provisional Application 60/970,172 filed on 5 Sep. 2007.

TECHNICAL FIELD OF THE INVENTION

The invention is directed to a spray nozzle manifold, an arrangement of such spray nozzle manifolds and a process to quench a hot gas using such an arrangement.

BACKGROUND OF THE INVENTION

US-A-2006/0260191 describes a vessel in which a hot synthesis gas as generated in an adjacent gasification reactor is cooled by injecting a quenching liquid into a stream of said hot synthesis gas. In particular FIG. 4 of that publication shows a gasification reactor for gasification of a solid carbonaceous feedstock to obtain a synthesis gas mixture having a temperature of between 1200 and 1800° C. The reactor has an outlet for hot synthesis gas at its upper end and an outlet for slag at its lower end. The reactor itself is provided with a quenching means to lower the temperature in a first step to a temperature below the solidification point of the non-gaseous components as present in the synthesis gas. The synthesis gas is further reduced in temperature by injecting a mist of water into the flow of synthesis gas in a separate quenching vessel connected to the gasification reactor by means of a duct. An advantage of the quenching vessel is that the design of such a vessel can be much simpler than a waste heat boiler having multiple heat exchanger banks. A further advantage is that a synthesis gas may be obtained which contains water at a level, which is lower than the saturation content. This makes it possible to obtain a substantially cooled synthesis gas from which ash can be separated using a filter as for example described in EP-B-1178858, or more preferably by using a cyclone.

DE-A-102005004341 describes a spray nozzle manifold comprising a first co-axial passage for supply of an atomisation gas, a second co-axial passage present in said first passage for supply of a liquid. The spray nozzle manifold further has more than one laterally spaced nozzle for atomisation and spraying liquid.

Applicants have found that injecting a quenching medium in a hot synthesis gas containing non-gaseous components, such as ash, is not straightforward. For example, if the spray nozzle manifold of DE-A-102005004341 would have been applied serious fouling of the spray nozzles would have occurred due to the presence of the non-gaseous components as present in the hot synthesis gas. The present invention provides means for injecting a quenching medium, which would not suffer from such fouling.

SUMMARY OF THE INVENTION

A spray nozzle manifold comprising a first co-axial passage for supply of an atomisation gas, a second co-axial passage present in said first passage for supply of a liquid, more than one laterally spaced nozzles for atomisation and spraying liquid in a direction away from the longitudinal axis of the manifold attached to the first passage, said nozzles having an inlet for liquid fluidly connected to said second passage, an inlet for atomisation gas fluidly connected to the first passage, a mixing chamber wherein atomisation gas and liquid mix and an outlet for a mixture of atomisation gas and liquid, wherein the nozzle has an opening for discharge of atomisation gas which opening is in fluid communication with the first passage at a position upstream of the mixing chamber and wherein a shield is fixed to the first passage surrounding the nozzle.

Applicants found that by providing a shield surrounding the nozzles in combination with means to purge the space between the shield and the nozzle a spray nozzle manifold is obtained wherein fouling by the non-gaseous components can be effectively avoided.

BRIEF DESCRIPTION OF THE DRAWINGS

FIG. 1 shows a cross-sectional view of a quench vessel.

FIG. 1b shows a cross-sectional view of another embodiment of a quench vessel.

DETAILED DESCRIPTION

Figure 2:
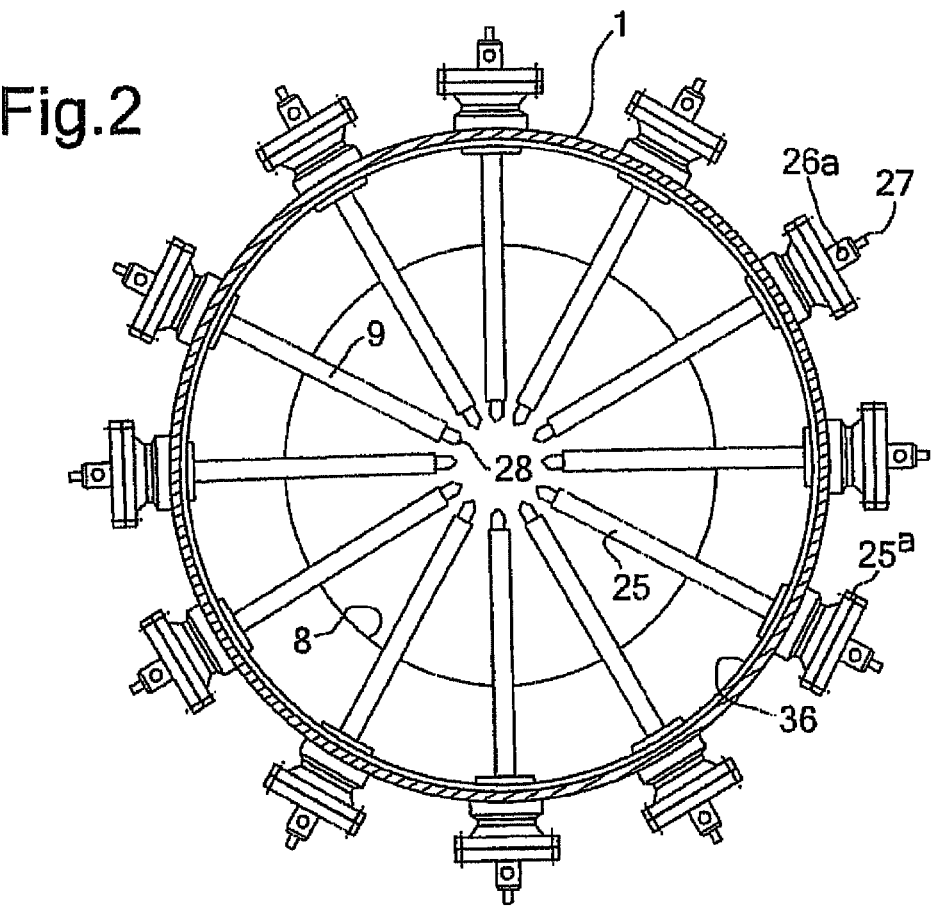
FIG. 2 shows a cross-sectional view AA' of the quench vessel of FIG. 1 or FIG. 1b showing an arrangement of spray nozzle manifolds.

The spray nozzle manifold is defined using terms as upper, top, lower, downward, horizontal and vertical. These terms relate to the preferred orientation of the spray nozzle manifold when in use as also shown in FIGS. 1-4. These terms do not intend to limit the scope of the invention to a spray nozzle manifold having only this orientation.

The spray nozzle manifold according to the invention has a first co-axial passage for supply of an atomisation gas and a second co-axial passage present in said first passage for supply of a liquid. These passages are preferably tubular. The laterally spaced nozzles are positioned such that they atomize and spray a liquid in a direction away from the longitudinal axis of the manifold. Preferably the nozzles are positioned in a line parallel to the longitudinal axis. Preferably the nozzles are positioned to spray in the same direction and perpendicular to the longitudinal axis, apart from an additional nozzle positioned at the end of the passage which may spray in a different direction as will be described below.

The nozzles are attached to the first passage. Preferably 3 to and including 10 nozzles are provided on one spray nozzle manifold. The nozzles have an inlet for liquid fluidly connected to said second passage and an inlet for atomisation gas fluidly connected to the first passage. The nozzles have a mixing chamber wherein atomisation gas and liquid mix and an outlet for a mixture of atomisation gas and liquid.

The first and second passages of the spray nozzle manifold are preferably fluidly connected to means to supply atomisation gas and means to supply liquid respectively at one end of said passages. At the opposite end of the passages of the manifold an additional nozzle is preferably present which has a spray direction, which is tilted with respect to the spray direction of the other nozzles. More preferably the spray direction of the outer-end nozzle makes an angle of between 0 and 45° with the spray direction of the other nozzles on said manifold.

In order to reduce ash deposits on the exterior of the nozzle an opening or more openings in the nozzle for discharge of atomisation gas is provided. This opening is in fluid communication with the first passage at a position upstream of the mixing chamber. Part of the atomising gas will flow through these openings and remove or avoid ash from depositing on the exterior of the nozzle. The nozzle having such openings is surrounded by a shield, which extends from the first passage and has an open end to allow passage of the liquid spray as exiting from the nozzles. Such a shield can surround more than one nozzle. Preferably each individual nozzle is provided with a separate shield. More preferably the shield is a tubular part surrounding a nozzle.

Preferably the spray nozzle manifold is provided with means to avoid or remove deposits to accumulate on top of the spray nozzle manifold. Such means can be mechanical rapper means directly on the spray nozzle manifold itself or on metal shields placed above said manifold. Another possible means is acoustic cleaning means. Another means is a blaster to continuously or either intermittently or in any combination blast away any deposits, which may form on the upper side of spray nozzle manifold. Such a blaster suitably makes use of part of the atomising gas as blast gas. Possible blaster may be a row of laterally spaced openings along the upper side of the first passage. When used to cool a hot synthesis gas the spray direction is downward and the flow direction of the synthesis gas is also downward. The gas exiting these openings at the upper side avoid deposition of ash. More preferably the blaster are mounted on top of the spray nozzle manifold having a horizontal blasting direction along the upper side of the spray nozzle manifold.

Preferably a number of laterally spaced openings are present in the wall of the first passage at its opposite, top, side. Through these openings atomising gas flows, thereby avoiding or removing any ash deposits.

The nozzles suitably comprise a vertical and central supply passage for a liquid fluidly connected with the second manifold passage, as present in a passage body. The passage body has outward and radial discharge openings at its lower end. These radial discharge openings exit in the mixing chamber. The mixing chamber comprises an annular space fluidly connected to the first manifold passage for atomisation gas and fluidly connected to a single outlet passage at the lower end of the central passage body. The outlet passage is defined by the inner wall of a nozzle body. The outlet passage terminates at its lower end in a diverging outlet opening for a mixture of liquid and atomisation gas.

The diverging outlet opening results in that in use a cone-shaped spray of liquid quenching medium and atomisation gas is discharged. The angle of the cone is preferably between 10 and 70° and more preferably between 15 and 25° (angle β in FIG. 4). An example of such a nozzle is shown in FIG. 2 of US-A-2004/0222317, which publication is hereby incorporated by reference.

The invention is also directed to an arrangement of more than one of the above spray nozzle manifolds. Preferably an arrangement wherein the majority of the nozzles are directed in substantially the same direction, wherein the manifolds are radially positioned in one, suitably horizontal, circular plane and wherein means to supply atomisation gas and liquid to the manifold are present along its circumferential and wherein the ends of the manifolds at the centre of the circle are spaced away from each other. Preferably the arrangement has from 6 to 15 of the above spray nozzle manifolds.

The above arrangement is preferably positioned in a vertically oriented vessel having an inlet for hot (synthesis) gas at its upper end and an outlet for quenched gas at its lower end defining a flow path for the gas, which intersects the horizontal arrangement of spray nozzle manifolds. Preferably the separate spray nozzle manifolds are fixed through a number of separate openings in the wall of the vessel by means of a flange in such a way that the individual manifolds can be taken out for maintenance, for example the supply conduits for atomising gas and liquid can be easily connected to the ends of the manifold, which stick out of the vessel.

The inner wall of the vessel at the horizontal elevation at which the arrangement of spray nozzle manifolds is positioned preferably has the shape of a divergent conical part having walls, which are inclined outwardly in the downward direction. Preferably these walls have a membrane wall design. The term membrane wall design is commonly known and refers to a cooled wall arrangement. Such a wall is gas tight and comprises an arrangement of interconnected conduits. Cooling is typically accomplished by evaporating cooling water. These conduits are fluidly connected via a common distributor to a supply for cooling medium and at their other ends fluidly connected to a common header to discharge used cooling medium.

The divergent conical part has walls, which are inclined outwardly in the downward direction. Preferably the angle ($\alpha$ in FIGS. 1 and 1b) between the surface of this wall and the vertical axis of the vessel is between 3° and 30° and more preferably between 5° and 10°. Preferably the minimum distance between the centre of the outlet opening of the nozzles and the wall of the divergent conical part is between 0.2 and 1 m (distance d in FIG. 3). The angle and the distance will ensure that the liquid will have evaporated before it can contact the internal wall (parts) of the vessel. This is preferred because wet ash deposits are not easy to remove.

The invention is also directed to a process in which a flow of hot gas is cooled by quenching with liquid droplets. In this process a spray comprising liquid droplets and an atomisation gas is injected into the flow of hot gas using a spray nozzle manifold arrangement as described above. In said process the hot gas is passed in a direction perpendicular to the circular plane of said arrangement and the spray is injected in the same direction as the direction of the hot gas.

The liquid may be any liquid having a suitable viscosity in order to be atomized. Non-limiting examples of the liquid to be injected are a hydrocarbon liquid, a waste stream as obtained in a downstream process. Preferably the liquid comprises at least 50 wt % water. Most preferably the liquid is substantially water (i.e. >95 vol %). In a preferred embodiment wastewater, also referred to as black water, as may be obtained in a downstream synthesis gas scrubber is used as the liquid.

It is preferred that the liquid is injected in the form of a mist of fine liquid droplets. More preferably the mist comprises droplets having a diameter of from 50 to 200 µm, even more preferably from 50 to 150 µm. Preferably, at least 60 vol. % of the injected liquid is in the form of droplets having the indicated sizes.

To enhance quenching of the hot gas, the quenching medium is preferably injected with a mean velocity of between 10 and 60 m/s and more preferably between 20 and 50 m/s.

The atomisation gas may be, for example $N_2$, $CO_2$, steam or synthesis gas. A preferred atomising gas is synthesis gas recycled from a downstream process step. Using atomisation gas has the advantage that the difference between injection pressure and the pressure of the hot gas to be quenched/cooled may be reduced while achieving the same preferred droplet size and velocity.

It is preferred that the liquid is injected with an injection pressure of at least 5 bar above the pressure of the hot gas, preferably from at least 10 bar above the pressure of the hot gas and up to 20 bar above the pressure of the hot gas.

Preferably the injected quenching medium has a temperature of at most 50° C. below the bubble point at the prevailing pressure conditions at the point of injection, particularly at most 15° C., even more preferably at most 10° C. below the bubble point. To this end, if the injected quenching medium is water, it usually has a temperature of above 90° C., preferably above 150° C., more preferably from 200° C. to 270° C., for example 230° C. Hereby a rapid vaporization of the injected quenching medium is obtained, while cold spots are avoided. The temperature will obviously depend on the pressure of the hot gas.

The hot gas is preferably an ash containing gaseous mixture of carbon monoxide and hydrogen having a pressure of between 2 and 10 MPa and an initial temperature of between 500 and 900° C., more preferably between 600 and 800° C. The process is especially directed to a process wherein the hot gas is obtained by partial oxidation of an ash containing carbonaceous feedstock. Examples of such ash containing feedstocks are coal, coke from coal, coal liquefaction residues, petroleum coke, soot, biomass, and particulate solids derived from oil shale, tar sands and pitch. The coal may be of any type, including lignite, sub-bituminous, bituminous and anthracite. The liquid preferably comprises water. The temperature of the gas after the quenching step is preferably between 200 and 600° C. and more preferably between 300 and 500° C. and even more preferably between 350 and 450° C. The atomising gas as supplied in the first co-axial passage preferably has a pressure of between 0.5 and 2 MPa above the pressure of the gaseous mixture of carbon monoxide and hydrogen. According to an especially preferred embodiment, the amount of injected water is selected such that the gas after injection of the liquid by means of the arrangement comprises at least 40 vol. % $H_2O$, preferably from 40 to 60 vol. % $H_2O$, more preferably from 40 to 55 vol. % $H_2O$.

A significant part of the solids as present in the cooled mixture of hydrogen and carbon monoxide as obtained in the cooling step described above are preferably separated by means of a cyclone. The remaining solids are removed in a subsequent scrubbing step. Preferably the scrubbing step comprises a venturi scrubber followed by a packed bed wash column. The resultant gas will have a high water content of between 50 and 60 vol % which makes this gas suitable to perform a downstream shift reaction. In this catalytic shift reaction carbon monoxide reacts with water to carbon dioxide and hydrogen. Because water is already present in the feed to the shift less or no additional water at all has to be added in the shift section. A shift reaction is advantageous when pure hydrogen or a higher hydrogen to carbon monoxide ratio is required. Examples of such applications are so-called IGCC processes with carbon dioxide capture, hydrogen manufacturing and processes wherein the mixture is used as feed, for example as feed to Fischer-Tropsch synthesis, an acetic acid synthesis, a methanol synthesis and a di-methyl-ether synthesis or as a reducing gas such as in direct ore reduction processes.

The gas as obtained in the scrubbing step is preferably further purified to separate $CO_2$, $H_2S$, COS and/or HCN and other components. Examples of processes suited for such purification are the commercial gas treating processes Sulfinol-D, Sulfinol-M, DIPA-X, Genosorb, Selexol and Rectisol.

FIG. 1 shows a vertical positioned quenching vessel 1. Vessel 1 has an inlet 2 for hot gas at its upper end, an outlet 3 for cooled gas at its lower end defining a pathway 4 for a gas flow directed downwardly. Vessel 1 is also provided with spray nozzle manifolds 9 for injecting a quench medium into the pathway 4 for the gas flow. FIG. 1 shows a first internal tubular wall part 5 which wall part 5 has an opening 6 fluidly connected to the inlet 2 for hot gas. Tubular wall part 5 is connected at its lower end with a divergent conical part 7 having walls 8 which are inclined outwardly in the direction of the pathway 4 for gas. As shown, the spray nozzle manifolds 9 for injecting a quench medium into the pathway 4 for the gas flow are present in the space 10 enclosed by the divergent conical part 7.

Divergent conical part 7 is followed at its lower end 11 by a second tubular inner wall 12. The lower open end 13 of the second tubular inner wall 12 is in fluid communication with the outlet 3 for cooled gas.

FIG. 1 also shows angle α, which is about 7.5° in the illustrated embodiment. The second tubular inner wall 12 is provided with one or more rappers 15. The lower end of vessel 1 has a tapered end 1a terminating in a central opening 127 as the outlet 3 for cooled gas.

Figure 4:
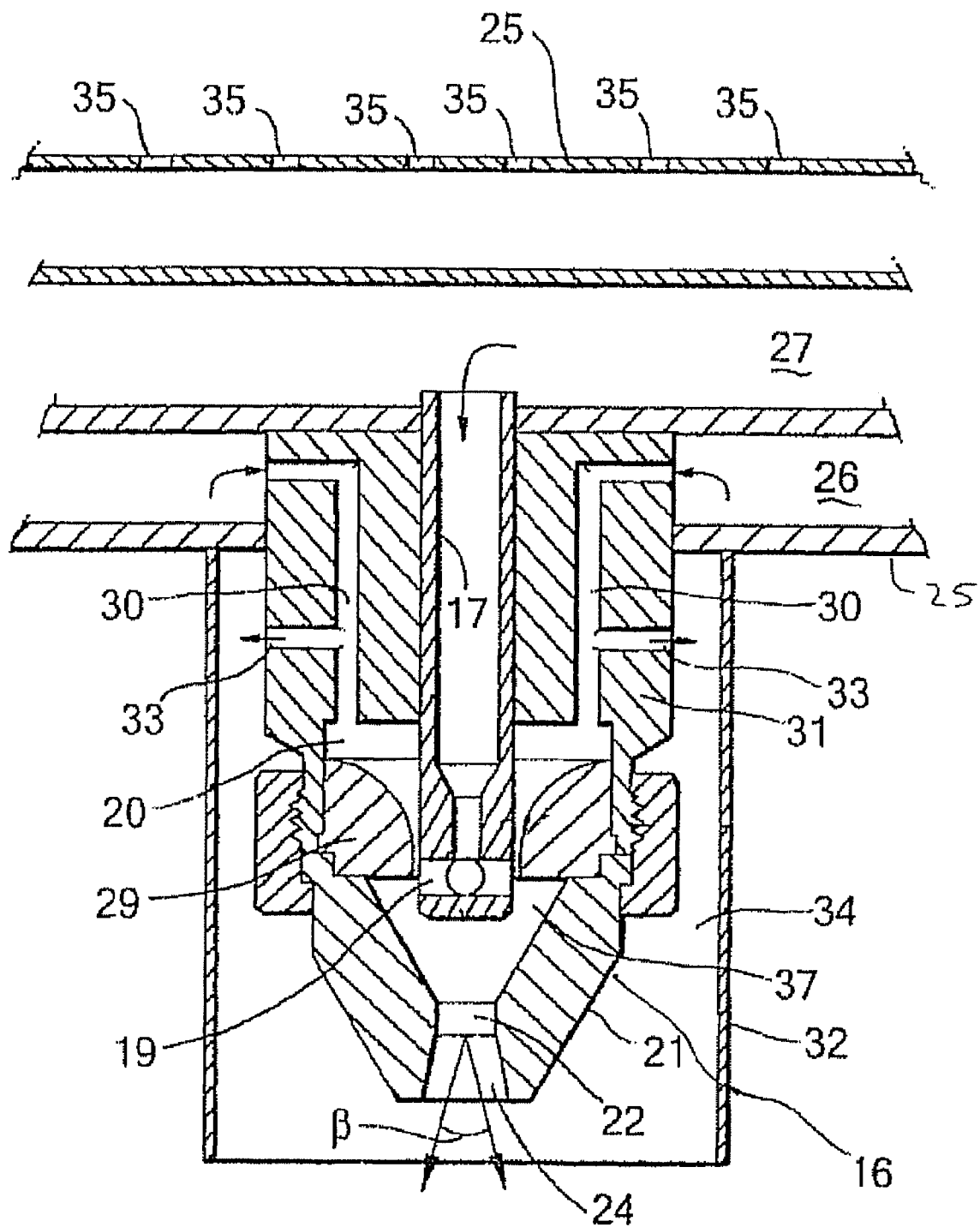
FIG. 4 shows a detail of the spray nozzle manifold as schematically shown in FIG. 3.

FIG. 1b shows a similar vertical positioned quenching vessel 1b as shown in FIG. 1. Vessel 1b is different from vessel 1 in that the inlet 2b for hot gas is provided in a side wall of the upper end of vessel 1b. Such a configuration is preferred when use is made of a connecting duct 5b as shown in FIG. 4 of US-A-2006/0260191. The upper end of the vessel 1b is referred to as the gas reversal chamber.

FIG. 2 shows 12 radially disposed spray nozzle manifolds 25 (9 in FIGS. 1 and 1b) provided with downwardly directed nozzles as seen from above. The spray nozzle manifolds 25 are fixed to the wall of vessel 1 and intersect with wall 8 of the divergent conical part 7 and extend to a central position. The spray nozzle manifolds 25 are connected to the vessel via a flange 25a and can therefore be easily removed for repairs or maintenance. The spray nozzle manifolds 25 are provided with a nozzle 28 at its end pointing towards the centre of the vessel 1.

Figure 3:
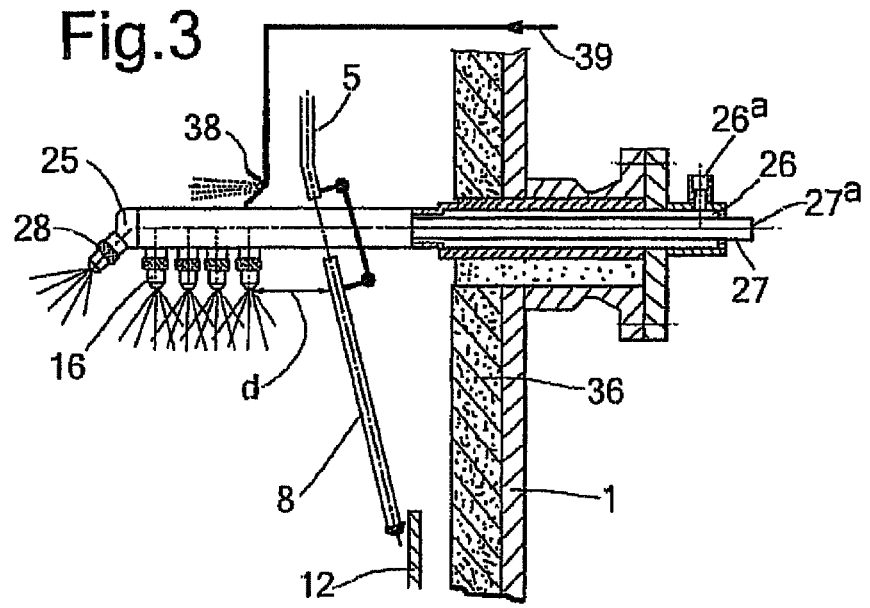
FIG. 3 shows a spray nozzle manifold and part of the wall of a quench vessel.

FIG. 3 shows such a spray nozzle manifold 25 in more detail. One spray nozzle manifold 25 is provided with a supply channel 26, the first co-axial passage, for atomisation gas and a supply channel 27, the second co-axial passage, for quenching medium. Four laterally spaced and downwardly directed nozzles 16 are provided and one slightly tilted nozzle 28 is provided on the illustrated spray nozzle manifold 25. The spray nozzle manifold is fixed in an opening in the wall of vessel 1. The wall of vessel 1 is protected against the high temperatures by means of membrane wall 8 of the divergent conical part 7 and refractory 36, which is present as a layer against the inner side of said wall. Also shown is the upper end of the second inner wall 12 and the lower end of tubular wall part 5. The supply channel 26 is connected to an inlet 26a for atomisation gas. The supply channel 27 is connected to an inlet 27a for liquid.

FIG. 3 also shows a blaster 38 as present on the upper side of spray nozzle manifold 25. Blaster 38 is present to continuously or intermittently blast away any deposits, which may form on the upper side of spray nozzle manifold 25. The direction of the blaster is in line with the horizontal direction of spray nozzle manifold 25. Blaster 38 is provided with a supply conduit 39 for blasting gas.

FIG. 4 shows a detail of the spray nozzle manifold 25 and one nozzle 16. Nozzle 16 has a vertical and central supply passage as present in supply passage body 17 for the liquid quenching medium as supplied via supply channel 27. The passage body 17 has outward and radial discharge openings 19 at its lower end for quenching medium exiting in a mixing chamber 37. The mixing chamber 37 is in fluid communication with an annular passage 20 for downwardly flowing atomisation gas. The annular passage 20 is in fluid communication with atomisation gas supply channel 26 via a passage 30 in base body 31. The annular passage 20 is defined by the supply passage body 17 and an outer nozzle body 21 and an insert 29. The annular passage 20 is, via mixing chamber 37, fluidly connected to a single outlet passage 22 at the lower end of nozzle 16. Outlet passage 22 being defined by the inner wall of the nozzle body 21 and wherein said outlet passage terminates at its lower end in a diverging outlet opening 24 for a mixture of quenching medium and atomisation gas.

FIG. 4 also shows a preferred shield 32 fixed at its upper end to spray nozzle manifold 25 and open at its lower end. Shield 32 may have any form, for example rectangular. Suitably the form of shield 32 is tubular. In an alternative embodiment one shield can surround more than one nozzle. Nozzle 16 is provided with atomizing outlet openings 33 which are in fluid communication with the supply channel 26 for atomisation gas. Through these openings 33 part of the atomisation gas exits into a space between the nozzle 16 and its surrounding shield 32. In this manner it is avoided that ash can accumulate in said space 34. Also shown are openings 35 at the upper end of spray nozzle manifold 25. Through these openings 35 another part of the atomisation gas can be discharged in order to remove or avoid ash accumulating on top of the spray nozzle manifold 25.

The invention claimed is:

1. A spray nozzle manifold comprising a first co-axial passage for supply of an atomisation gas, a second co-axial passage present in said first passage for supply of a liquid, more than one laterally spay nozzle for atomisation and spraying liquid in a direction away from the longitudinal axis of the manifold attached to the first passage, said laterally spaced nozzles run along one side of the first passage and a number of laterally spaced openings are present in the wall of the first passage at its opposite end, said nozzles having an inlet for liquid fluidly connected to said second passage, an inlet for atomisation gas fluidly connected to the first passage, a mixing chamber wherein atomisation gas and liquid mix and an outlet for a mixture of atomisation gas and liquid, wherein the nozzle has an opening for discharge of atomisation gas which said opening is in fluid communication with the first passage at a position upstream of the mixing chamber and wherein a shield is fixed to the first passage surrounding the nozzle.

2. A spray nozzle manifold according to claim 1, wherein the first and second passage are fluidly connected to conduits to supply atomisation gas and liquid respectively at one end of said passages and wherein at the other end of said passages a nozzle is present which has a spray direction, which is tilted with respect to the spray direction of the other nozzles.

3. A spray nozzle manifold according to claim 1, wherein the nozzle comprises a vertical and central supply passage for a liquid fluidly connected with the second co-axial passage, as present in a passage body, said passage body having outward and radial discharge openings at its lower end, said radial discharge openings exiting in the mixing chamber, said mixing chamber comprising an annular space fluidly connected to the first co-axial passage for atomisation gas and fluidly connected to a single outlet passage at the lower end of the nozzle, said outlet passage being defined by the inner wall of a nozzle body and wherein said outlet passage terminates at its lower end in a diverging outlet opening for a mixture of liquid and atomisation gas.

4. A spray nozzle manifold according to claim 1, wherein a blaster is present to continuously or intermittently or in any combination blast away any deposits, which may form on the upper side of a spray nozzle manifold.

5. An arrangement of spray nozzle manifolds, said spray nozzle manifolds comprise a first co-axial passage for supply of an atomisation gas, a second co-axial passage present in said first passage for supply of a liquid, more than one laterally spaced nozzle for atomisation and spraying liquid in a direction away from the longitudinal axis of the manifold attached to the first passage, said laterally spaced nozzles run along one side of the first passage and a number of laterally spaced openings are present in the wall of the first passage at its opposite end, said nozzles having an inlet for liquid fluidly connected to said second passage, an inlet for atomisation gas fluidly connected to the first passage, a mixing chamber wherein the nozzle has an opening for discharge of atomisation gas which said opening is in fluid communication with the first passage at a position upstream of the mixing chamber and wherein a shield is fixed to the first passage surrounding the nozzle,
wherein the majority of the nozzles are directed in substantially the same direction, wherein the manifolds are radially positioned in one horizontal circular plane and wherein conduits supplying atomisation gas and liquid to the manifold are present along its circumference and wherein the ends of the manifold at the center of the circle are spaced away from each other.

6. An arrangement according to claim 5, wherein the first and second passage of the spray nozzle manifolds are fluidly connected to conduits to supply atomisation gas and liquid respectively at one end of said passages and wherein at the other end of said passages a nozzle is present which has a spray direction, which is tilted with respect to the spray direction of the other nozzles.

7. An arrangement according to claim 5, wherein the nozzle comprises a vertical and central supply passage for a liquid fluidly connected with the second co-axial passage, as present in a passage body, said passage body having outward and radial discharge openings at its lower end, said radial discharge openings exiting in the mixing chamber, said mixing chamber comprising an annular space fluidly connected to the first co-axial passage for atomisation gas and fluidly connected to a single outlet passage at the lower end of the nozzle, said outlet passage being defined by the inner wall of a nozzle body and wherein said outlet passage terminates at its lower end in a diverging outlet opening for a mixture of liquid and atomisation gas.

8. An arrangement according to claim 5, wherein blasters are present to continuously or intermittently or in any combination blast away any deposits, which may form on the upper side of a spray nozzle manifold.

9. A process to quench a flow of hot gas by injecting a spray of liquid droplets present in an atomisation gas into the flow of hot gas using an arrangement according to claim 5, wherein the hot gas is passed in a direction perpendicular to the circular plane and wherein the spray is injected in the same direction as the flow direction of the hot gas.

10. A process according to claim 9, wherein the hot gas is an ash containing gaseous mixture of carbon monoxide and hydrogen having a pressure of between 2 and 10 MPa and an initial temperature of between 500 and 900° C., the liquid comprises water and wherein the temperature of the gas after the quenching step is between 200 and 600° C. and wherein an atomising gas as supplied in the first co-axial passage has a pressure of between 0.5 and 2 MPa above the pressure of the gaseous mixture of carbon monoxide and hydrogen.

11. A process according to claim 10, wherein the initial temperature is between 600 and 800° C. and wherein the temperature of the gas after the quenching step is between 300 and 500° C.

* * * * *